United States Patent [19]

Nishikawa et al.

[11] 4,231,266
[45] Nov. 4, 1980

[54] LUBRICATING DEVICE FOR POWER TRANSMISSION UNIT

[75] Inventors: Kazuyoshi Nishikawa; Makoto Uno; Hideaki Koga, all of Toyota, Japan

[73] Assignee: Toyota Jidosha Kogyo Kabushiki Kaisha, Aichi, Japan

[21] Appl. No.: 929,235

[22] Filed: Jul. 31, 1978

[30] Foreign Application Priority Data

Oct. 12, 1977 [JP] Japan .................. 52/122273

[51] Int. Cl.² .................. F16H 57/04; F16N 7/26
[52] U.S. Cl. .................. 74/467; 184/6.12; 184/11 R; 192/113 B
[58] Field of Search .................. 74/467, 606 R; 192/113 R, 113 B; 184/6.12, 11

[56] References Cited

U.S. PATENT DOCUMENTS

| 2,270,980 | 1/1942 | Tidball .................. 74/606 R |
| 2,368,963 | 2/1945 | Boden .................. 184/11 |
| 3,182,527 | 5/1965 | Bryan .................. 74/467 X |
| 3,785,458 | 1/1974 | Caldwell et al. .................. 184/6.12 |

FOREIGN PATENT DOCUMENTS

| 1979972 | 2/1968 | Fed. Rep. of Germany. |
| 2437608 | 2/1975 | Fed. Rep. of Germany. |
| 222863 | 7/1922 | United Kingdom. |
| 739994 | 11/1955 | United Kingdom. |
| 1016483 | 1/1966 | United Kingdom. |

Primary Examiner—Louis Rimrodt
Attorney, Agent, or Firm—Armstrong, Nikaido, Marmelstein & Kubovcik

[57] ABSTRACT

In a power transmission unit, a protrusion is provided on an inner wall of the transmission housing to be splashed with lubricating oil pumped up by rotation of an idler gear on the idler shaft, and an oil receiver is arranged under the protrusion to receive the lubricating oil dropping from the protrusion thereby to convey the oil into the bearing at one side of the idler shaft.

7 Claims, 9 Drawing Figures

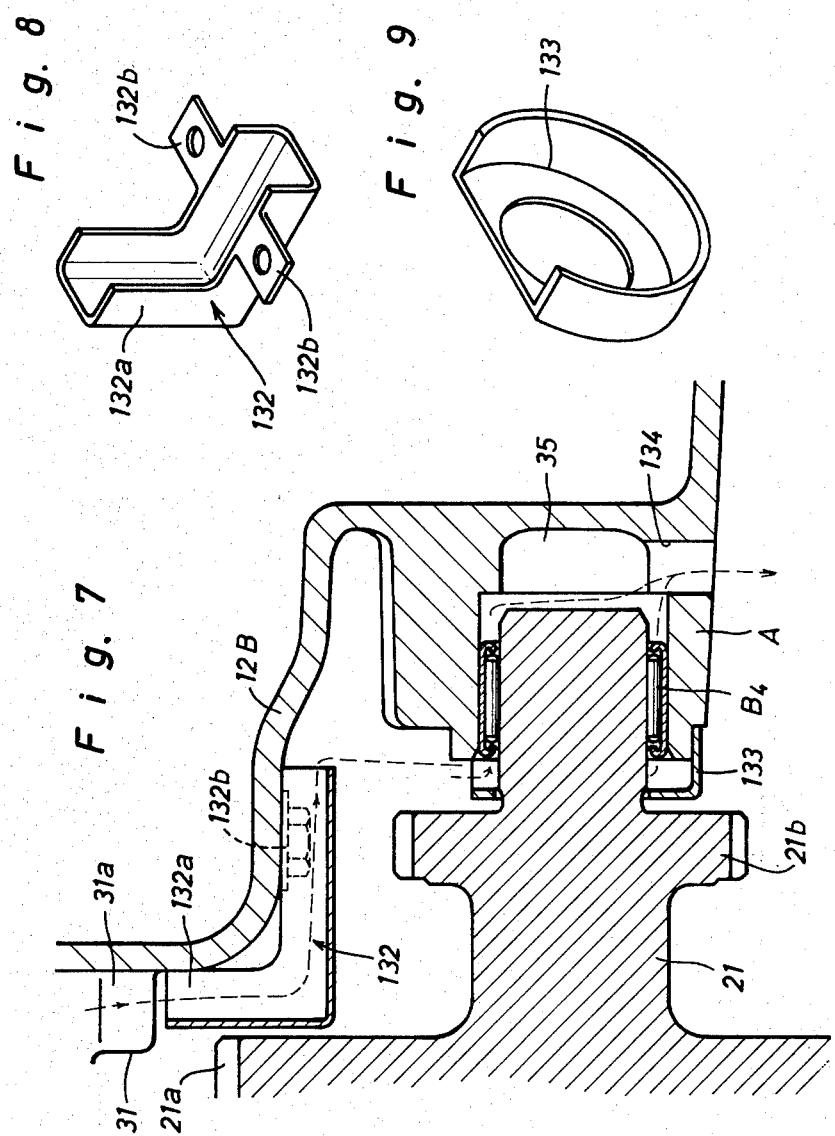

LUBRICATING DEVICE FOR POWER TRANSMISSION UNIT

BACKGROUND OF THE INVENTION

The present invention relates generally to power transmission units for motor vehicles, and more particularly to a power transmission unit of the type which comprises a housing secured to a cylinder block of an engine and having upper and lower chambers therein, a clutch assembly arranged within the upper chamber of the housing, a change-speed gearing arranged within the lower chamber of the housing and having a mainshaft and a countershaft journalled in parallel with the clutch output member, and an idler shaft arranged between the clutch output member and the mainshaft and journalled in parallel with the clutch output member, and in which an idler gear on the idler shaft is meshed with a driving gear on the clutch output member and with an input gear on the mainshaft, and a reverse gear on the mainshaft is able to mesh with a reverse driving gear on the idler shaft by way of a reverse idler gear on a reverse idler shaft.

In a power transmission unit of this kind, the idler shaft is supported by a pair of axially spaced bearings, and the reverse driving gear is axially spaced from the idler gear. In use of the transmission unit, a predetermined amount of lubrication oil is stored within the lower chamber of the housing to lubricate the transmission mechanism. When the transmission unit is operated, the lubricating oil is stirred up by rotation of the change-speed gearing and pumped up by rotation of the idler gear toward the driving gear on the clutch output member. Thus, the lubricating oil serves to lubricate the bearings for the clutch output member, the idler shaft, the mainshaft and the countershaft. It is, however, to be observed that the lubricating oil cannot be pumped up toward the reverse driving gear during forward drive of the transmission unit because of disengagement of the reverse idler gear from the reverse gear on the mainshaft. This means that while the bearing for the idler shaft in the region of the reverse driving gear is temporarily lubricated by the lubricating oil during reverse drive of the transmission unit, the lubricating oil does not serve to lubricate the bearing for the idler shaft during forward drive of the transmission unit.

SUMMARY OF THE INVENTION

It is, therefore, a primary object of the present invention to provide a power transmission unit in which the lubricating oil pumped up by rotation of the idler gear serves to lubricate the bearing for the idler shaft in the region of the reverse driving gear.

According to the present invention, there is provided a power transmission unit for a motor vehicle comprising:

a housing to be secured to a cylinder block of an engine, the housing having upper and lower chambers therein;

a power input member located within the housing for connection to a crankshaft of the engine by means of a disengageable coupling arranged within the upper chamber of the housing, the power input member being supported from the housing by a pair of axially spaced bearings;

a change-speed gearing arranged within the lower chamber of the housing and having a mainshaft and a countershaft, each supported from the housing by a respective pair of axially spaced bearings so as to be parallel with the power input member;

an idler shaft arranged between the power input member and the mainshaft and supported from the housing by a pair of axially spaced bearings so as to be parallel with the power input member, the idler shaft being provided with an idler gear and with a reverse driving gear spaced from the idler gear, the idler gear meshing in a common vertical plane with a driving gear on the power input member and with an input gear on the mainshaft, and the reverse driving gear being able to mesh in a common vertical plane with a reverse gear axially spaced apart from the input gear on the mainshaft by way of a reverse idler gear on a reverse idler shaft, there being provided within the housing means for collecting lubricating oil pumped up by rotation of the idler gear and means for conveying the collected lubricating oil to the bearing on the idler shaft in the region of the reverse driving gear.

BRIEF DESCRIPTION OF THE DRAWINGS

Additional objects and advantages of the present invention will be more readily apparent from the following detailed description of preferred embodiments thereof when taken together with the accompanying drawings in which:

FIG. 5 is an enlarged front view of an oil receiver shown in FIG. 4;

FIG. 6 is a side view of the oil receiver;

FIG. 7 is an enlarged sectional view showing another embodiment of the present invention;

FIG. 8 is a perspective view of an oil receiver shown in FIG. 7; and

FIG. 9 is a perspective view of an oil pocket shown in FIG. 7.

DESCRIPTION OF THE PREFERRED EMBODIMENTS

Figure 1:
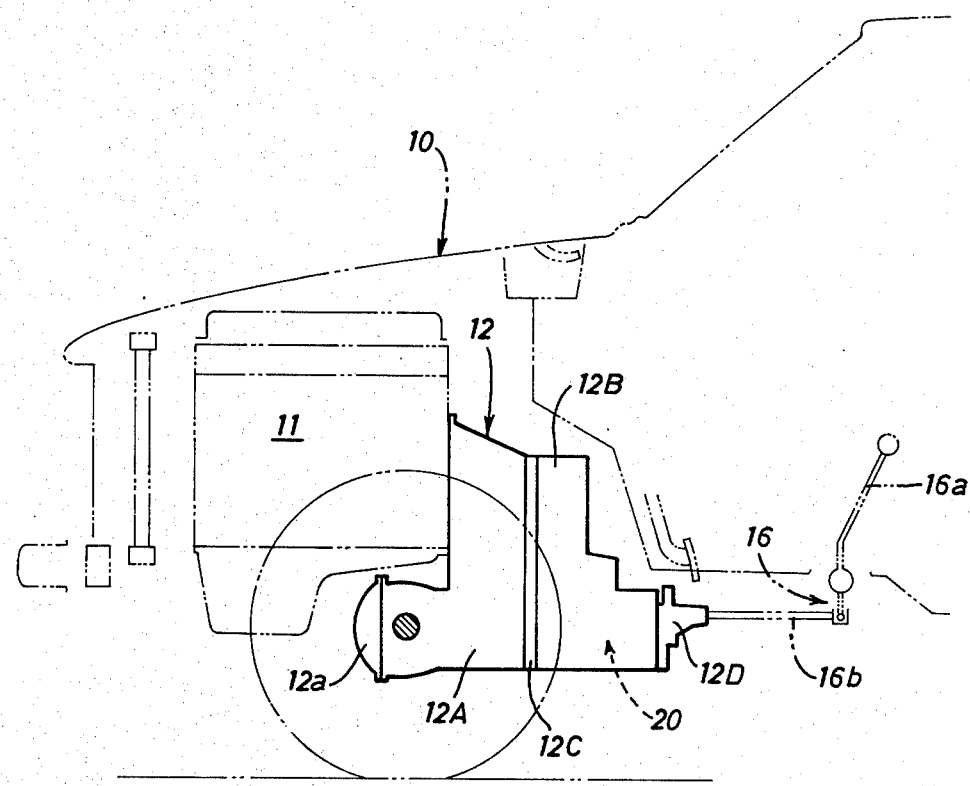
FIG. 1 is a schematic side view of a motor vehicle equipped with a power transmission unit in accordance with the present invention.
Figure 2:
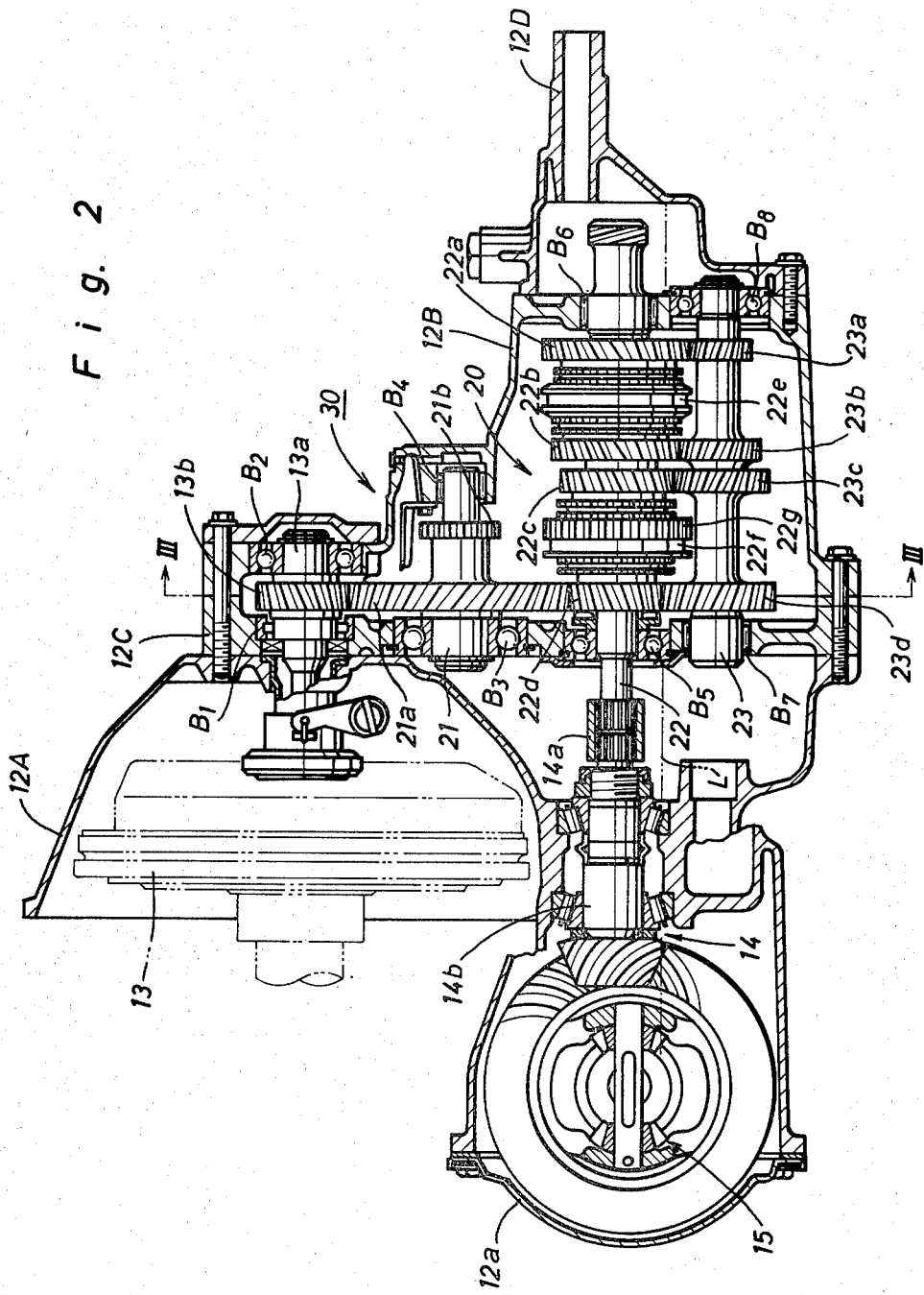
FIG. 2 is an enlarged sectional view of the transmission of FIG. 1.

Referring now to the drawings, in particular to FIG. 1, there is illustrated a power transmission unit which is mounted on a motor vehicle 10 of the front-engine front-wheel drive type. A housing assembly 12 for the transmission unit comprises a trans-axle casing 12A and a transmission casing 12B which are fluid-tightly jointed to each other by way of an upright intermediate plate 12C. The trans-axle casing 12A is rigidly secured to an upright rear-face of a cylinder block of an engine 11 and, a well shown in FIG. 2, is configured generally to conform with a friction clutch 13 contained in the upper compartment thereof and with a final drive gearing 14 and a differential gear unit 15 contained in the lower compartment thereof. The lower compartment of the trans-axle casing 12A is sealingly closed by a dome-shaped cover plate 12a to retain lubricating oil within the housing assembly 12.

The transmission casing 12B is fluid-tightly secured at the upright front seating face thereof to the upright rear seating face of the trans-axle casing 12A by way of the intermediate plate 12C and is configured generally to conform with a change-speed gearing 20 contained therein. The change-speed gearing 20 is drivingly connected at one hand thereof to the crankshaft of engine 11 through the friction clutch 13 and connected at the other hand thereof to the differential gear unit 15 through the final drive gearing 14. In addition, an extension housing 12D is fluid-tightly secured to the rear end-face of the transmission casing 12B to complete the housing assembly 12.

The friction clutch 13 has a power input member for connection to the crankshaft of engine 11 and a power output member 13a (which forms the input member for the gearing) supported by a pair of axially spaced journal bearings $B_1$ and $B_2$ respectively from the intermediate plate 12C and from the transmission casing 12B. The power output member 13a is formed with a driving gear 13b in the form of a helical gear located between the bearings $B_1$ and $B_2$ and is further surrounded by a seal member to keep foreign matter out of the casing 12B and to retain lubricating oil within the casing 12B. An idler shaft 21 is supported by a pair of axially spaced bearings $B_3$ and $B_4$ respectively from the intermediate plate 12C and from the transmission casing 12B and is also formed with an idler gear 21a and a reverse driving gear 21b. The idler gear 21a is in the form of a helical gear and permanently meshes with the driving gear 13b on the power output member 13a. The reverse driving gear 21b is in the form of a helical gear and axially spaced from the idler gear 21a.

The change-speed gearing 20 includes an output mainshaft 22 which is supported by a pair of axially spaced journal bearings $B_5$ and which $B_6$ and is coaxially connected to a drive pinion shaft 14b of the final drive gearing 14 by way of a spline coupling 14a. The mainshaft 22 is formed integrally with an input gear or fourth gear 22d which is in the form of a helical gear and which meshes with the idler gear 21a and with a helical gear 23d integral with a countershaft 23. The countershaft 23 is also formed integrally with three further helical gears 23a, 23b and 23c of differing sizes which are meshed respectively with first, second and third helical gears 22a, 22b and 22c journalled on the mainshaft 22. The selection of gear ratios is effected by a gear-shift mechanism 16 (see FIG. 1) which is operatively connected through a mechanical linkage 16b to a pair of synchronizers 22e and 22f.

When the first synchronizer 22e is in its neutral position, the first and second gears 22a, 22b are free from the mainshaft 23. The synchronizer 22e acts in the usual manner to establish synchronism in a driving connection between the mainshaft 22 and the first gear 22a or the second gear 22b, depending upon which direction the synchronizer 22e is shifted by an unshown first shift fork of the gear-shift mechanism 16. When the second synchronizer 22f is in its neutral position, the third and fourth gears 22c, 22d are free from the mainshaft 22. The synchronizer 22f acts in the usual manner to establish synchronism in a driving connection between the mainshaft 22 and the third gear 22c or the fourth gear 22d, depending upon which direction the synchronizer 22f is shifted by an unshown second shift-fork of the gear-shift mechanism 16.

Figure 3:
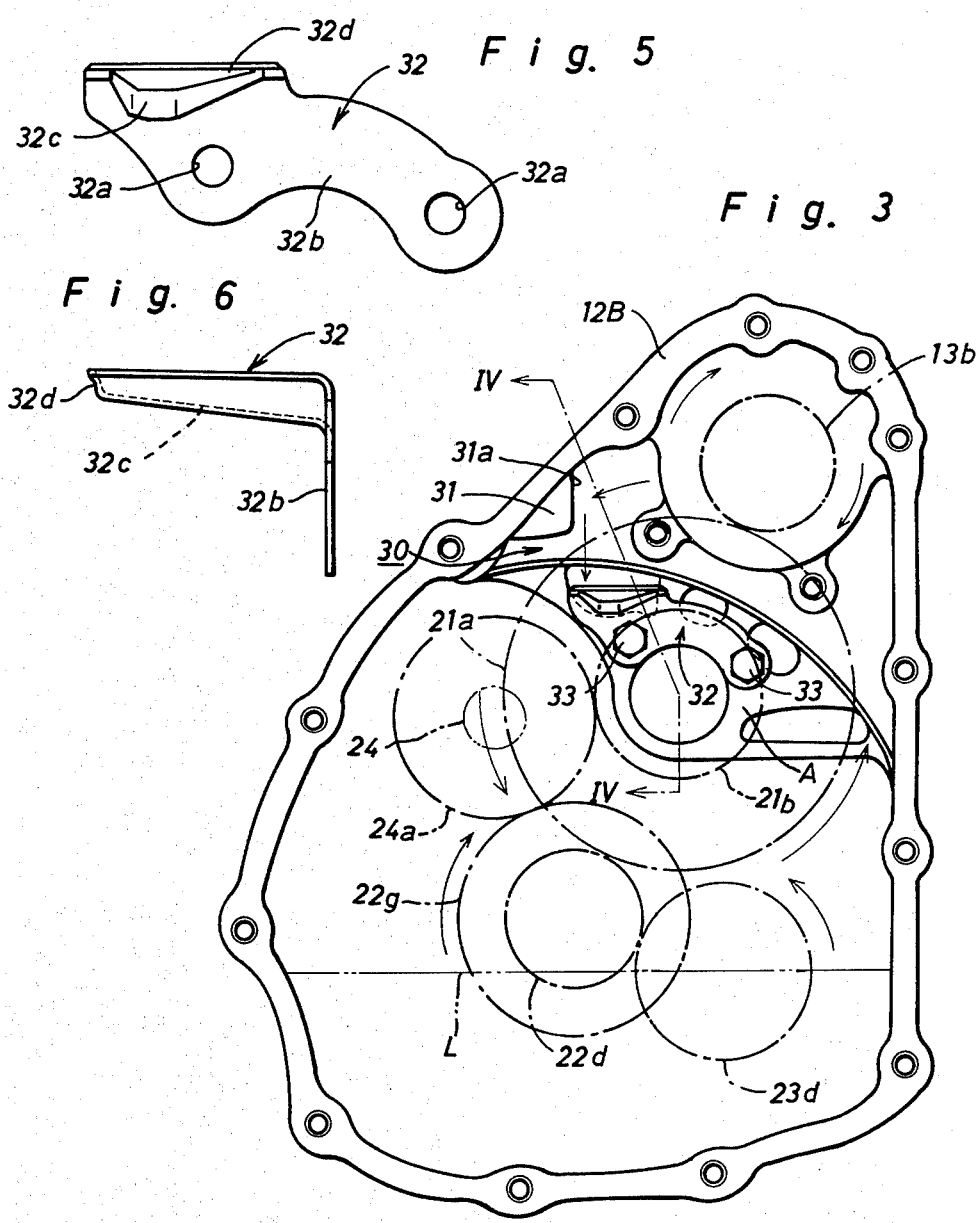
FIG. 3 is an enlarged front view taken along the plane of section line III—III of FIG. 2, showing a reverse idler gear in mesh with a reverse driving gear and a reverse gear.

A reverse gear 22g in the form of a spur gear is formed integrally with the second synchronizer 22f and is arranged to be in a common vertical plane with the reverse driving gear 21b when the synchronizer 22f is in its neutral position. As illustrated in FIG. 3, if a reverse idler gear 24a in the form of a spur gear journalled on a reverse idler shaft 24 is shifted by an unshown third shift-fork of the gear-shift mechanism 16 under the neutral condition of the synchronizer 22f, the reverse idler gear 24a is brought into engagement with the spur gears 21b and 22g to establish a reverse torque delivery path between the clutch output member 13a and the mainshaft 22.

The countershaft 23 is supported by a pair of axially spaced bearings $B_7$ and $B_8$ respectively from the intermediate plate 12C and the transmission casing 12B and is located substantially at the same height above the ground level as the mainshaft 22 and in parallel with the same. In FIG. 2, the countershaft 23 is, however, illustrated at a position lower than the mainshaft 22 to clearly depict the meshing engagement of the gear transmission 20. In addition, a predetermined amount of the lubrication oil is stored within the lower chamber of the housing assembly 12 so that the lower portions of the gears 22a, 22b, 22c, 22d and 22g on the mainshaft 22 and the gears 23a, 23b, 23c and 23d on the countershaft 23 dip into the oil. In FIGS. 2 and 3, an imaginary line L indicates a liquid surface of the lubrication oil during operation of the transmission unit.

Figure 4:
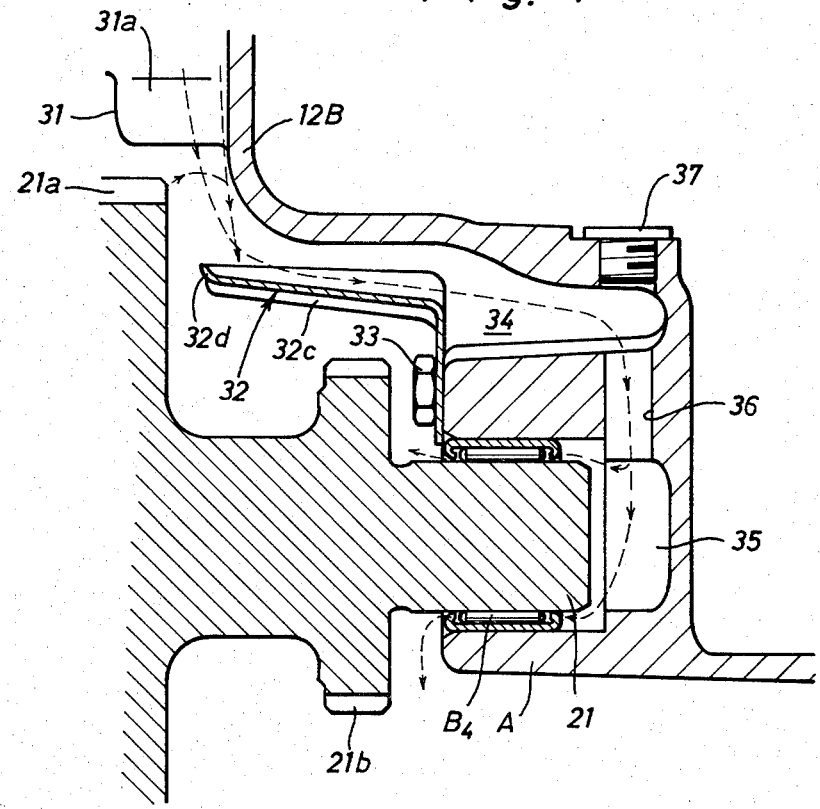
FIG. 4 is an enlarged sectional view taken along the plane of section line IV—IV of FIG. 3.

Hereinafter, a lubricating device 30 in accordance with the present invention will be described in detail. The lubricating device 30 comprises, in general, a protrusion 31 adjacent the idler gear 21a and an oil receiver adjacent the bearing $B_4$. The protrusion 31 extends toward the idler gear 21a from the inner wall of the transmission casing 12B, as shown in FIGS. 3 and 4, and is formed with a vertical guide face 31a to be splashed with the lubricating oil pumped up by rotaion of the idler gear 21a. As shown in FIGS. 5 and 6, the oil receiver 32 includes a vertical flange 32b with mounting holes 32a and a guide portion 32d with a bottom wall 32c inclined toward the vertical flange 32b. The oil receiver 32 is secured in position at the vertical flange 32b thereof by fastening bolts 33 threaded into an upper portion of a bearing boss A through the mounting holes 32a, and the guide portion 32d opens at its tip end under the vertical guide face 31a of protrusion 31. Above the bearing boss A there is provided a cavity 34 opening toward the guide portion 32d. The cavity 34 also communicates through a vertical hole 36 into a cavity 35 formed behind the bearing $B_4$. The cavities 34 and 35 are formed during the casting process of the transmission casing 12B, and the vertical through hole 36 is formed by drilling through the housing wall 12B. The upper opening end of vertical hole 36 is sealingly closed by a plug 37.

With the lubricating device 30 mentioned above, it will be noted that the lubricating oil dropped from the protrusion 31 is guided by the oil receiver 32 into the cavity 34 and subsequently flows into the cavity 35 through the vertical hole 36. The lubricating oil in cavity 35 passes through the bearing $B_4$ in a forward direction. This means that the cavity 35 serves as an oil reservoir to store the lubricating oil therein and that the bearing $B_4$ is effectively lubricated by the lubricating oil from the reservoir.

In operation, assuming that a selected one of forward speed ratios in the change-speed gearing 20 is established by operation of the gear-shift mechanism 16, rotational torque from the engine 11 is conveyed to the driving gear 13b by way of the friction clutch 13 and is then transmitted to the countershaft 23 by way of the idler gear 21a and input gear 22d. When the countershaft 23 is rotated, the first, second, third and fourth gears on the mainshaft 22 are rotated by way of the gears 23a, 23b, 23c and 23d on the countershaft 23. Then, the lubricating oil stored within the housing assembly 12 is stirred up by the gears on the mainshaft 22 and the gears on the countershaft 23. The lubrication oil stirred up by the first gears 22a and 23a is partly picked up to lubricate the bearings $B_6$ and $B_8$. On the other hand, the lubrication oil stirred up by the gears 22d and 23d is pumped up by the idler gear 21a toward the oil receiver 32, as shown in FIG. 3, and flows around the same. The lubricating oil flowing around the idler gear 21a is partly picked up by the driving gear 13b and flows around the same. Thus, the lubricating oil flowing around the gears 22d, 23d, 21a and 13b flows outwardly by centrifugal force thereof to lubricate the bearings $B_1$, $B_2$, $B_3$, $B_5$ and $B_7$ and teeth of the gears 13b, 21a, 22d and 23d.

In this instance, a portion of the lubricating oil flowing around the idler gear 21a splashes onto the protrusion 31 and drops into the oil receiver 32. Then, the lubricating oil is guided by the receiver 32 into the cavity 34 and, in turn, flows into the cavity 35 through the vertical hole 36. Thus, the lubricating oil in the cavity 35 serves to lubricate the bearing $B_4$ and then passes through the bearing and returns to the bottom of the housing assembly 12.

When the reverse torque delivery path is established by operation of the gear-shift mechanism 16, the reverse driving gear 21b is coupled with the reverse gear 22g by means of the reverse idler gear 24a to rotate the reverse gear 22g. In this instance, the lubricating oil pumped up by the gears 22g, 24a and 21b is directly supplied to the bearing $B_4$ to lubricate it in addition to the lubricating oil from the cavity 35.

In FIGS. 7 to 9, there is illustrated another embodiment of the present invention in which an L-shaped oil receiver 132 is secured at its lateral flanges 132b to an inner wall of the transmission casing 12B. The oil receiver 132 has a U-shaped cross-section and co-operates with the protrusion 31 to guide the lubricating oil toward the bearing $B_4$. An oil pocket 133 is securedly coupled over the front portion of bearing boss A and has an upper opening to receive the lubricating oil dropping from the rear end of oil receiver 132. Additionally, a vertical hole 134 is provided on the bottom portion of bearing boss A to drain off the lubricating oil in the cavity 35 therethrough.

With the embodiment described here, the lubricating oil splashed onto the vertical guide face 31a of protrusion 31 drops into the oil receiver 132 and, in turn, passes into the oil pocket 133. The lubricating oil in oil pocket 133 flows in a rearward direction to lubricate the bearing $B_4$ and then drains off through the cavity 35 and vertical hole 134.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. In a power transmission unit for a motor vehicle comprising:

a housing to be secured to a cylinder block of an engine, said housing having upper and lower chambers therein;

a power input member located within said housing for connection to a crankshaft of the engine by means of a disengageable coupling arranged within the upper chamber of said housing, the power input member being supported from said housing by a pair of axially spaced bearings;

a change-speed gearing means arranged within the lower chamber of said housing and having a mainshaft and a countershaft, each supported from said housing, parallel to said input member, by a respective pair of axially spaced bearings; and an idler shaft arranged between said power input member and said mainshaft and supported from said housing, parallel to said power input member, by a pair of axially spaced bearings, said idler shaft being provided with an idler gear and with a reverse driving gear spaced from said idler gear, said idler gear meshing in a common vertical plane with a driving gear on said power input member and with an input gear on said mainshaft, and said reverse driving gear being adapted to mesh in a common vertical plane with a reverse gear axially spaced from said input gear on said mainshaft by way of a reverse idler gear on a reverse idler shaft;

the improvement wherein said housing is provided on the inner wall thereof with a protrusion located above said idler gear and having a vertical guide face to be splashed with lubricating oil pumped up by rotation of said idler gear, and an oil receiver is secured to a bearing boss of said housing, said receiver having a guide portion located above said reverse driving gear and inclined toward the bearing on said idler shaft in the region of said reverse driving gear to receive the oil dropping from said protrusion.

2. A power transmission unit as claimed in claim 1 wherein a first cavity is formed in said housing above said bearing boss to receive the lubricating oil from said oil receiver, a second cavity is formed in said bearing boss adjacent to the bearing to be lubricated, and a vertical hole is formed through said bearing boss to interconnect said two cavities.

3. A power transmission unit as claimed in claim 2 wherein said two cavities are formed during the casting process of said housing and said vertical hole is formed by drilling said housing and said bearing boss, said hole in said housing being subsequently closed.

4. A power transmission unit as claimed in claim 1 wherein said oil receiver is secured to the inner wall of said housing beneath the vertical guide face of said protrusion to guide the lubricating oil toward the bearing to be lubricated.

5. A power transmission unit as claimed in claim 4 further including an oil pocket coupled over said bearing boss of said housing to receive lubricating oil from said oil receiver.

6. A power transmission unit as claimed in claim 5 further including a cavity formed adjacent to the bearing to be lubricated to receive lubricating oil from said oil pocket and a vertical hole formed in the bottom portion of said bearing boss to drain off oil from said cavity.

7. A power transmission unit as claimed in any of claims 1–6 wherein said idler gear is a helical gear designed to pump lubricating oil toward said protrusion of said housing.

* * * * *